C. F. Rice.
Sawing Shingles.
No 99,237.  Patented Jan. 25, 1870.
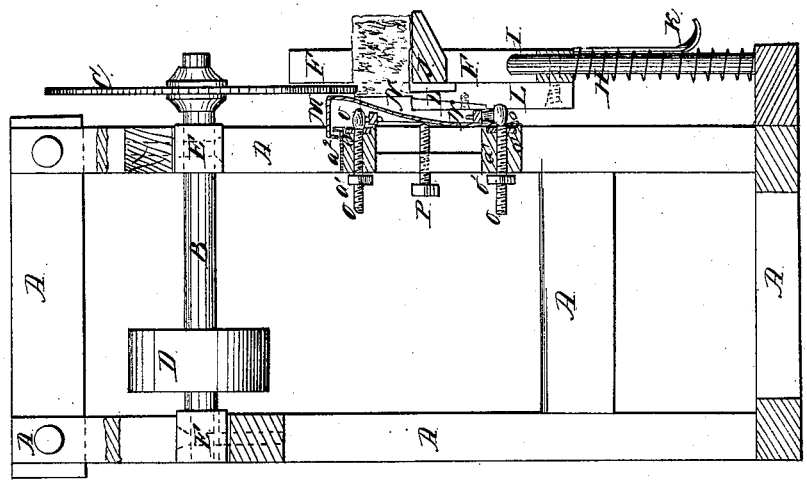
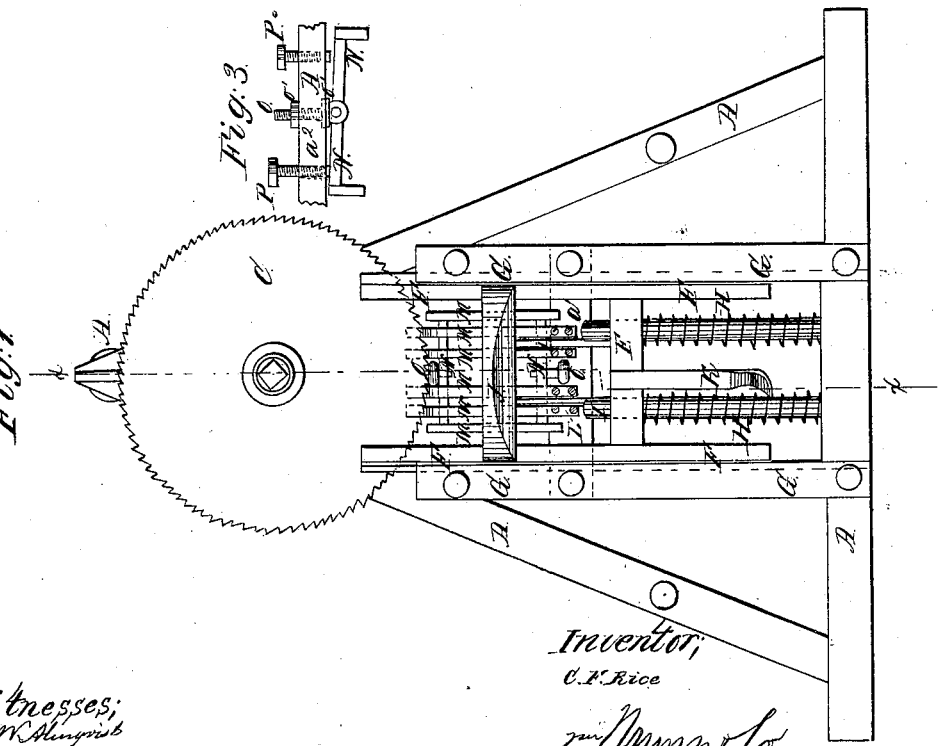
Witnesses:
Inventor,
C. F. Rice
Attorneys.

UNITED STATES PATENT OFFICE.

CHARLES F. RICE, OF BROOKFIELD, MASSACHUSETTS.

IMPROVEMENT IN SHINGLE-MACHINES.

Specification forming part of Letters Patent No. 89,287, dated January 25, 1870.

*To all whom it may concern:*

Be it known that I, CHARLES F. RICE, of Brookfield, in the county of Worcester and State of Massachusetts, have invented a new and Improved Sawing-Machine; and I do hereby declare that the following is a full, clear, and exact description thereof, which will enable others skilled in the art to make and use the same, reference being had to the accompanying drawings, forming part of this specification, in which—

Figure 1 is a front view of my improved machine. Fig. 2 is a detail sectional view of the same, taken through the line $x\ x$, Fig. 1. Fig. 3 is a detail top view of the pivoted gage-frame.

Similar letters of reference indicate corresponding parts.

My invention has for its object to furnish an improved machine designed especially for sawing shingles, but equally applicable for other sawing, which shall be simple in construction and convenient and effective in operation; and it consists in the construction and combination of the various parts, as hereinafter more fully described.

A is the frame of the machine, the end parts of which are made triangular in form, as shown in Fig. 1, said triangular parts being connected by cross-bars, as shown in Fig. 2.

B is the saw-shaft, to the forward end of which the saw C is attached, which is driven by a belt passing around the pulley D, attached to it, and which revolves in bearings E, attached to the bridge-trees of the frame A. The forward bearing of the shaft B is placed below the bridge-tree, to which it is attached, and the rear bearing above its bridge-tree, as shown in Fig. 2, so that the said bridge-trees may more effectually resist the pressure of the shaft B when the saw is at work, and that the bearing nearest the saw may not be in the way of the shingle or strip sawed.

F is the carriage, which is placed in a vertical position, and slides up and down in ways G, attached to the forward end of the frame A. The carriage F is raised, pressing the block to be sawed up against the saw C, by the action of the coiled springs H, placed beneath the said carriage F and coiled around stationary guide-rods I to keep them in a vertical position.

J is the table, upon which the block to be sawed is placed, and which is securely attached to the carriage F, so as to be raised and lowered with and by said carriage.

K is a step attached to the carriage F, so that the carriage may be lowered to allow the block to be pushed forward for another cut by the operator with his foot. If desired, the carriage F may be raised by means of a weighted lever; but I prefer to raise it by coiled springs, in the manner first described. The inner edge of the block from which the shingle or other strip is being sawed is supported by the bars L, attached to the carriage F, as shown in Figs. 1 and 2.

M are four springs, (more or less,) made in about the shape shown in Fig. 2, and the lower ends of which are securely attached to a cross-bar, $a'$, of the frame A, and which are kept from springing forward against the saw C by hooks or downwardly-projecting flanges formed upon their upper ends, and which catch upon an upwardly-projecting flange formed upon or attached to the cross-bar $a^2$ of the frame A. The springs M hold the shingle or other strip being sawed forward against the saw, and at the same time serve as guides to conduct it away from the saw when sawed off.

N is the gage-frame, the middle parts of the cross-bars of which are pivoted to the heads of the bolts O, which pass through the cross-bars $a'\ a^2$ of the frame A, and are made adjustable by means of nuts $o'$, as shown in Figs. 2 and 3, so that the thickness of the shingle or other strip cut from the block may be regulated at will.

P are set-screws, which pass through bars of the frame A, in such positions that the side bars of the frame N may strike against their forward ends, so as to limit the movement or rock of the frame N, and consequently the taper of the shingles or other strips sawed from the block. The thicker ends of the shingles or other strips that require to be sawed with a taper are sawed alternately from each side of the block, so that the cut may always be with the grain of the wood.

By turning the screws P forward, so that both sides of the pivoted gage-frame N may be supported at the same time, strips may be sawed of uniform thickness.

Having thus described my invention, I claim as new and desire to secure by Letters Patent—

1. A vertically-reciprocating carriage, F, moved up to the saw and retracted therefrom, respectively, by means of springs H H and step K, each being arranged as set forth.

2. The arrangement upon the frame of the hooked springs M and angle-iron $a^2$, as and or the purpose specified.

CHARLES F. RICE.

Witnesses:
 JOHN DURANT,
 C. H. NEWELL.